Sept. 27, 1955  H. D. KRAFT  2,718,809
LONGITUDINALLY SLOTTED EXPANSION BOLT ASSEMBLY
Filed June 18, 1953  2 Sheets-Sheet 1
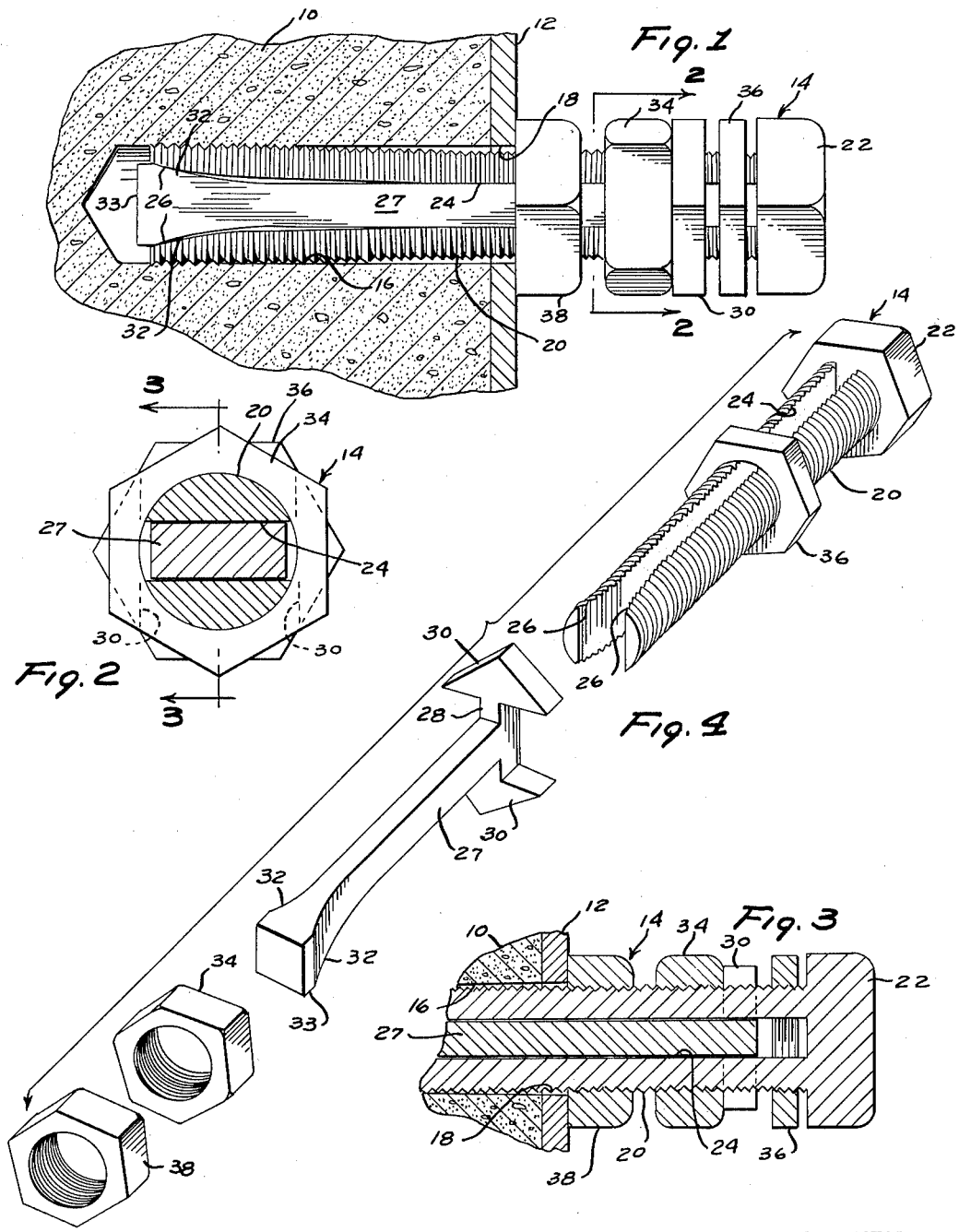
INVENTOR.
HYMAN D. KRAFT
BY
Frederick A. Zoda
ATTORNEY Sept. 27, 1955 H. D. KRAFT 2,718,809
LONGITUDINALLY SLOTTED EXPANSION BOLT ASSEMBLY
Filed June 18, 1953 2 Sheets-Sheet 2

INVENTOR.
HYMAN D. KRAFT
BY
Frederick A. Zoda
ATTORNEY

United States Patent Office 2,718,809
Patented Sept. 27, 1955

2,718,809

LONGITUDINALLY SLOTTED EXPANSION BOLT ASSEMBLY

Hyman D. Kraft, Flushing, N. Y.

Application June 18, 1953, Serial No. 362,545

4 Claims. (Cl. 85—2)

This invention relates to an expansion bolt, and more particularly, has reference to an expansion bolt designed particularly for engagement in solid or hollow masonry walls.

The main object of the present invention is to provide an improved expansion bolt that will facilitate the attachment of various objects to walls of the character referred to. In this connection, expansion shields or bolts of conventional design generally necessitate the drilling of a recess in the masonry which will be of substantially greater diameter than the bolt-receiving aperture of the work to be secured. As a result, it is necessary to use a template for marking out the locations at which the recesses in the masonry are to be formed. Obviously, this is a time-consuming, tedious task. The present invention eliminates the use of templates, and permits the work itself to be used as a template, since the expansion bolt constituting the invention is so designed as to allow the recess in the masonry to be formed to the same diameter as the bolt-receiving aperture of the work.

Further, conventional bolts have certain other disadvantages, among which is the requirement of drilling the recess in the masonry to an exact, predetermined depth. Another object of the invention, accordingly, is to so design the expansion bolt as to eliminate the requirement of drilling bolt-receiving recesses in masonry to exact depths.

Yet another object of the invention is to provide an expansion bolt that is specifically adapted to obviate the development of torque during the application of the bolt to the masonry, thereby to reduce strain on the bolt and allow, as a consequence, the use of smaller bolts than have heretofore been required in anchoring an object of known weight to the masonry surface.

Yet another object is to provide a bolt of the type stated so designed as to greatly enhance the shear load factors in the masonry, through the disposition of a uniform bearing surface against the wall of the recess, as distinguished from conventional expansion shield or bolt designs, which require supplementary bearing support with an attendant increase in the cost of the bolt.

Yet another object is to provide an expansion bolt designed to permit the head thereof to be fashioned in any of various, selected shapes, such as eyes, hooks, etc.

A further object of the invention is to provide an expansion bolt design which will be removable from a masonry wall in which it has been previously engaged with a minimum of difficulty or loss of time.

A further object of importance is to provide an expansion bolt as stated which will be formed in a manner that will define a solid cross-section from end to end thereof, as distinguished from conventional bolts wherein the shifting of an expansion wedge longitudinally of a sleeve to be expanded thereby often results in the defining of a hollow end portion at the inner end of the device, said hollow portion being of a weakened nature and being subject to inward bending under the severe pressure exerted radially and inwardly thereof by the wall of the masonry recess against which said sleeve is expanded.

Other objects will appear from the following description, the claims appended thereto, and from the annexed drawing, in which like reference characters designate like parts throughout the several views, and wherein:

Figure 1 is a fragmentary sectional view of a solid masonry wall and of an object supported thereagainst, an expansion bolt formed in accordance with the invention being illustrated partly in longitudinal section and partly in side elevation in operative relationship to said wall and object;

Figure 2 is an enlarged transverse sectional view on line 2—2 of Figure 1;

Figure 3 is a fragmentary, longitudinal sectional view on line 3—3 of Figure 2;

Figure 4 is an exploded perspective view of the expansion bolt per se;

Figure 5:
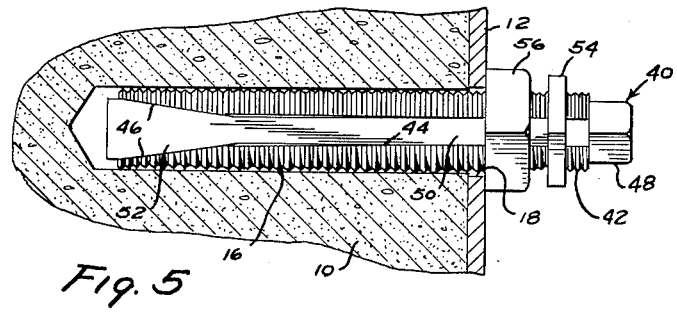
Figure 5 is a view similar to Figure 1, showing a modified form.

In Figures 1–4, there is shown a form of expansion bolt which is of general utility, said bolt being mounted on a solid masonry wall 10 to secure to said wall an object 12, which can be a metal plate, a piece of machinery, a bracket, etc. The expansion bolt has been designated generally by the reference numeral 14, and has its inner end portion engaged in a recess 16 drilled in the masonry, said recess registering with an aperture 18 formed in the work 12 and receiving the body of the expansion bolt.

As best shown in Figure 4, the expansion bolt has an elongated body 20 which in the illustrated example is threaded throughout its length. At one end the body 20 is integrally formed with an enlarged head 22, shown for the sake of example as being of hexagonal outer configuration to facilitate the gripping thereof by a wrench or similar tool, not shown. The head 22 could have other configurations, of course, and in a commercial embodiment of the invention, I might choose to form said head as an eye, as a hook, or in any other work-engaging shape found desirable, to adapt the device to particular supporting functions.

Formed in the body 20 and extending the full length thereof is a longitudinal slot 24, said slot being open at opposite sides throughout its length and being shaped with a tapered outer end portion the walls 26 of which converge in the direction of the head 22. The walls 26, in this connection, define an included angle which can be of any selected degree, it being mainly important that the angle selected be one which will provide maximum expansion of the bolt body within the recess 16, while still holding the friction between the slot walls and the expansion wedge means of the device to a minimum.

The wedge means has been designated at 27, and comprises an elongated wedge member the shank of which is so proportioned as to cross-section as to fit snugly within the slot 24 (see Figure 2) thus assuring that the device will have a solid cross-section throughout its length.

The wedge member shank at one end is integrally formed with a cross head 28 the opposite ends of which project through the open sides of the slot. The ends of the cross head, in this connection, are formed with enlargements or lugs 30 here shown as being triangular in shape, though other shapes might be used if desired.

That end of the wedge member shank remote from the cross head is progressively increased in cross sectional area in a direction away from the cross head as shown at 32, this construction complementing the tapered outer end portion of the slot 24. The tapered part of the wedge member shank merges into a heel 33 which aids in presetting the bolt body in the recess 16 of the masonry wall.

In assembling the parts of the device, one would first thread a nut 36 upon the threaded body of the expansion bolt, after which the wedge member would be inserted in the slot 24. Thereafter, a nut 34 is threaded onto the expansion bolt body, thus to dispose the cross head 28 and enlargements 30 between the nuts 34, 36. Threading of a third nut, designated at 38, onto the bolt body completes assembly of the device illustrated in Figures 1–4. The several nuts constitute abutment elements usable in a manner to be made presently apparent.

In use of the form of the invention shown in Figures 1–4, one first assembles the parts in the manner described above. Then, and assuming that the required number of recesses 16 has been formed in the masonry (using the work 12 as a template), the bolt is extended through a registering recess 16 and aperture 18. Previous to insertion of the bolt through the recess and aperture, the nut 36 will have been threaded in the direction of the head 22 away from the cross-head a substantial distance, and the nut 34 will likewise have been threaded away from the cross-head, in a direction away from head 22, also a substantial distance. Nut 38 will have been threaded away from the work 12.

Having fitted the expansion bolt to the recess and work, the user gives an initial set to the device, by lightly tapping the head 22 while the heel of the wedge member is engaged against the inner end of the recess. This expands the bolt body at its inner end by shifting the same longitudinally of the now stationary wedge member, with the wedge member spreading the opposite sides of the bolt body into engagement with the recess wall.

Nut 34 is now threaded to the right in Figure 1 to engage the enlargements or lugs 30, thereby shifting the wedge member longitudinally of the bolt body to further spread said body into engagement with the wall of the recess. As a result, the body is forced into gripping engagement with the recess wall, the threads constituting a roughened surface that will insure the tight engagement between the bolt body and recess wall.

It is important to note, in this regard, that the bolt body is in intimate contact with the recess wall over a substantial part of its surface area, thereby to increase the holding strength of the device when the same is in use. Further, the use of compositely formed sleeves, etc., such as have heretofore been required, is eliminated. Still further, the biasing of the diametrically opposite parts of the bolt body into engagement with the recess wall is accomplished without setting up a torque-induced strain that is a characteristic of conventional devices of the same general type.

When the device has been anchored firmly to the masonry in the manner discussed above, the user threads the nut 38 in the direction of the supported object or work 12, to bind the same in position against the wall 10.

At such time as it may be desired to remove the expansion bolt from its anchored position, it is merely necessary to back the nut 34 away from the cross head, after which the nut 36 is threaded against the cross head to force the wedge member to the right in Figure 1, thereby to free the opposite sides of the bolt for movement radially and inwardly of the recess.

In Figure 5, there is shown a modified form of the invention wherein the expansion bolt, designated generally at 40, has an elongated, threaded body 42 formed with a longitudinal slot 44 the outer end of which has sloped or obliquely extended side surfaces 46 diverging in a direction away from the head 48 of the device. In this form of the invention, head 48 has a non-circular configuration which may be square, hexagonal, or of other desired shape. The construction differs from that shown in Figures 1–4, however, in that the greatest transverse dimension of the head 48 is smaller than the diameter of the body 42.

A wedge member 50 is basically similar to the wedge member of Figures 1–4, and has an outer end 52 tapered complementarily to the outer end portion of the slot. At its inner end, the wedge member has a cross head 54 like that of the first form, engageable by a nut 56 analogous to nut 34. The nut 56, after being used to spread the opposite sides of the bolt body, can be turned back against the work 12 so as to assume the function of the nut 38. Of course, a second nut may be interposed between the cross head and the work for this purpose, if desired.

In this form of the invention, it is not necessary to permanently assemble a nut like the nut 36 of the first form with the bolt body. Rather, one can, by reason of the reduced size of the bolt body head, apply a nut for shifting the wedge member to the left in Figure 5, only when and if it becomes necessary to dislodge the expansion bolt from its associated masonry recess.

Figure 6:
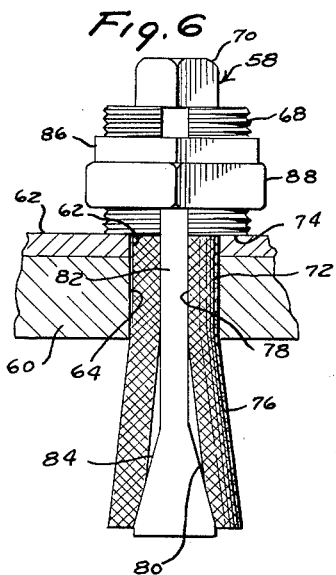
Figure 6 is a view similar to Figure 1 showing another modification.

In Figure 6, there is shown an expansion bolt designated generally at 58, that can be used to particular advantage in fastening the work to a floor surface or masonry base 60 in a position in which the work 62 is supported directly upon the masonry support. The masonry support has an opening 64 registering with an aperture 66 of the work, and projecting upwardly from the work and masonry is the threaded, large diameter body 68 of the expansion bolt, having at its outer end a reduced non-circular head 70.

The body 68, at its inner end, is integral with a reduced portion 72, the reduction in diameter serving to define a circumferential shoulder 74 on the device that binds against the work to discharge the function of the nuts 38, 56 of the first and second forms of the invention.

The reduced portion 74 of the bolt body is formed, throughout its length, with a roughened gripping surface 76 not unlike that conventionally provided on steel reinforcing rods of the type embedded in concrete. A longitudinal slot 78 extends from head 70 to the opposite ends of the bolt, and has divergent surfaces 80 at its open end. A wedge member 82, formed at its inner end with a cross head 86 and at its outer end with a tapered portion 84, substantially fills the slot, and when shifted longitudinally of the bolt body in one direction, serves to spread the opposite sides of the bolt body in the manner shown in Figure 6. The bolt is thus firmly anchored in position, and effectively engages the work against the associated masonry support.

A single nut 88 has been shown in Figure 6, but a second nut, not shown, can be an optional part of this form of the invention. Thus, the nut 88 is used for shifting the wedge member into its body-spreading position, as shown. The second nut might be used if the work is to be anchored to a ceiling or the like. In such instances the second nut might serve to increase the bearing area against the work, thereby to distribute the weight of the work to greater advantage and strengthen the assembly.

Figure 7:
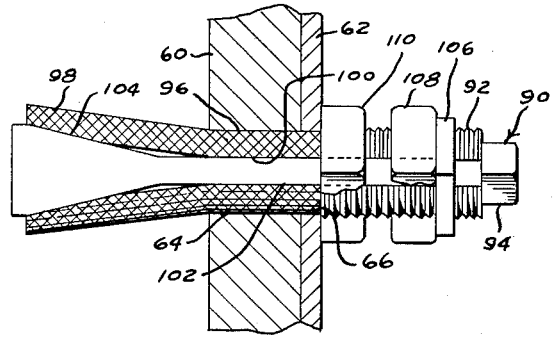
Figure 7 is a view similar to Figure 1 of still another modification.

In Figure 7, the expansion bolt 90 has a body 92 threaded for part of its length and integral at its outer end with a reduced, noncircular head 94. The remainder of the length of the bolt body is formed as a reduced portion 96 having a roughened or ribbed gripping surface, said reduced portion having spreadable end portions 98. A longitudinal slot 100 receives a wedge member 102 integral at its outer end with a wedging or tapered portion 104, and at its inner end with a cross head 106 having enlargements or lugs at its opposite ends. A nut 108 is threaded on the large diameter, outer end portion of the bolt body, to engage the cross head and shift the wedge member to a body-spreading position. Thereafter, a nut 110 can be threaded on the large diameter portion of the body against the work 62.

The forms of the invention shown in Figures 6 and 7 are particularly adapted for hollow wall installations, as shown, but can also be used in solid wall mountings.

Figure 8:
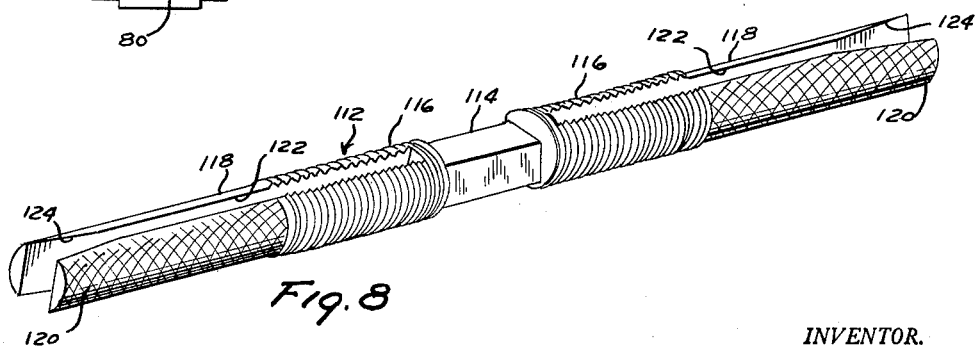
Figure 8 is a perspective view of the bolt body of another modified form.

In Figure 8, there is shown a double-ended expansion bolt designated generally by the reference numeral 112. In this form of the invention, a non-circular portion 114 is provided medially between the opposite ends of the device, said portion serving as a head capable of receiving a wrench or like tool. At each of its ends, the portion 114 merges into a threaded body 116, the body 116 at each side of the noncircular portion merging in turn into a roughened portion 120 the diameter of which is equal to the root diameter of the threads of the body.

A longitudinal slot 122 is extended from the portion 114 to each end of the device, each slot 122 being formed at its outer or open end with sloped or divergent surfaces 124.

The bolt shown in Figure 8 would be provided with a pair of wedge members, one for each slot, like those of the previously described forms of the device. Further, nuts would be applicable to the threaded parts of the bolt for the purpose of shifting the wedge members in selected directions.

This form of the invention may have particular adaptability as a means usable in prestressed concrete wall installations, for tying together two spaced and separately cast walls that are to be permanently connected by a poured pier filling the space therebetween. Heretofore, the separately cast walls have been provided with their own reinforcing rods, and have been separately raised into place, after which a pier is poured in the space therebetween, said pier having the adjacent vertical edges of the walls embedded therein. Obviously, the reinforcing rods have not been extended continuously from one wall through the pier to the other wall, and there has been a resultant loss of strength.

In accordance with the invention, the opposite ends of the expansion bolt may be anchored in the manner previously described, within tubular end portions of the reinforcements of the respective walls. As a result, the walls are held in proper position during the pouring of the piers, and additionally, a continuous reinforcement will result, extending fully through both walls and through the associated pier.

I believe that many other uses may be found for the expansion bolt, in its several forms, and it is believed to be of particular importance to note that the construction is characterized by ease of installation, strength, resistance to torsional strains, enhancement of shear load factors of the masonry, and versatility as regards mounting in both solid and hollow masonry walls. Still further, the construction, in every instance, is characterized by its elimination of supplementary bearing supports, elimination of templates for marking hole locations, removability of the bolt, and adaptability for forming different types of heads on the bolts.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles of operation and the means presently devised to carry out said principles, it being considered that the invention comprehends any minor change in construction that may be permitted within the scope of the appended claims.

I claim:
1. An expansion bolt for attaching an object having a bolt-receiving aperture to an associated support having a bolt-receiving recess aligned with and of a diameter corresponding to that of said aperture, comprising: an elongated body having one end adapted for insertion in the recess, said body being formed with a longitudinal slot opening upon said end thereof, the other end of the body being adapted to project out of the recess through said aperture of the object to be supported; a wedge member extending within and shiftable longitudinally of said slot and adapted at one end to enter as a wedge between the opposite walls of the slot to spread the same, thereby to expand the inserted end of said body transversely into engagement with the wall of the recess; means on the other end of the wedge member projecting laterally thereof outwardly from the body; and a pair of abutment elements mounted on the body for movement longitudinally thereof, said elements being shiftable independently of one another lengthwise of the body to selected locations along its length, both of said elements being disposed between said means and the inserted end of the body, one of the elements being engageable against said means to shift the wedge member in a direction to expand the body within the recess into engagement with the wall of the recess, and the other element being engageable against said object to hold the same against the support.

2. An expansion bolt as in claim 1, additionally including a third abutment element mounted on said body between said means or the wedge members and said other end of the body and shiftable lengthwise of the body independently of each of the first named abutment elements, said one element being adapted for shifting the wedge member in said body-expanding direction and the third element constituting means engageable against said wedge member means at the opposite sides thereof, for shifting the wedge member longitudinally of the body in an opposite direction, whereby to free the inserted end of the body from engagement with the wall of the recess.

3. An expansion bolt as in claim 2, wherein said slot extends for substantially the full length of the body to terminate in closely spaced relation to said other end of the body, said abutment elements being mounted for movement longitudinally of the body on the slotted portion thereof, said wedge member substantially filling the slot from end to end of the wedge member to impart a substantially solid cross sectional shape to the body at the location of the object-engaging abutment element.

4. An expansion bolt as in claim 3, wherein said body is provided with a continuous series of threads extending substantially from end to end thereof, the threads on the recessed end of the body constituting means roughening the surface of the body to afford a positive grip of the body upon the wall of the recess, said abutment elements being formed as nuts threadedly engaged with the projecting end of the body.

References Cited in the file of this patent
UNITED STATES PATENTS

| | | |
|---|---|---|
| 1,790,493 | Taylor | Jan. 27, 1931 |
| 1,823,428 | Hill | Sept. 15, 1931 |
| 2,462,910 | Simmons | Mar. 1, 1949 |
| 2,651,962 | Hammond | Sept. 15, 1953 |